(12) United States Patent
Hauser

(10) Patent No.: US 7,557,329 B2
(45) Date of Patent: Jul. 7, 2009

(54) LAYERED HEATING PLATE ELEMENT

(75) Inventor: Hubert Hauser, Wuerselen (DE)

(73) Assignee: Saint-Gobain Glass France, Courbevoie (FR)

( * ) Notice: Subject to any disclaimer, the term of this patent is extended or adjusted under 35 U.S.C. 154(b) by 250 days.

(21) Appl. No.: 10/558,416

(22) PCT Filed: May 26, 2004

(86) PCT No.: PCT/FR2004/001302

§ 371 (c)(1),
(2), (4) Date: Nov. 16, 2006

(87) PCT Pub. No.: WO2005/004539

PCT Pub. Date: Jan. 13, 2005

(65) Prior Publication Data

US 2007/0184282 A1    Aug. 9, 2007

(30) Foreign Application Priority Data

Jun. 5, 2003    (DE) ................................ 103 25 476

(51) Int. Cl.
*H05B 3/34* (2006.01)
*B32B 17/06* (2006.01)

(52) U.S. Cl. ...................... 219/528; 219/202; 219/203; 219/200; 219/213; 219/214; 219/219; 428/426

(58) Field of Classification Search .................. 219/528, 219/202–3, 200, 213–4, 219; 428/426
See application file for complete search history.

(56) References Cited

U.S. PATENT DOCUMENTS 5,616,266 A * 4/1997 Cooper ...................... 219/407
5,932,128 A    8/1999 Dishop
6,365,876 B1    4/2002 Park

FOREIGN PATENT DOCUMENTS

DE    42 16 376    11/1993
DE    100 33 336    4/2001

* cited by examiner

*Primary Examiner*—Shawntina Fuqua
(74) *Attorney, Agent, or Firm*—Oblon, Spivak, McClelland, Maier & Neustadt, P.C.

(57) ABSTRACT

A plate element including at least one rigid pane, in particular a pane of glass, which bears an electrically conductive coating that heats by applying an electrical voltage via connectors, and an electrically conductive partial surface, which is electrically isolated from the coating and provided with at least one electrical connector of its own. The partial surface is provided for connection to a ground potential.

17 Claims, 1 Drawing Sheet

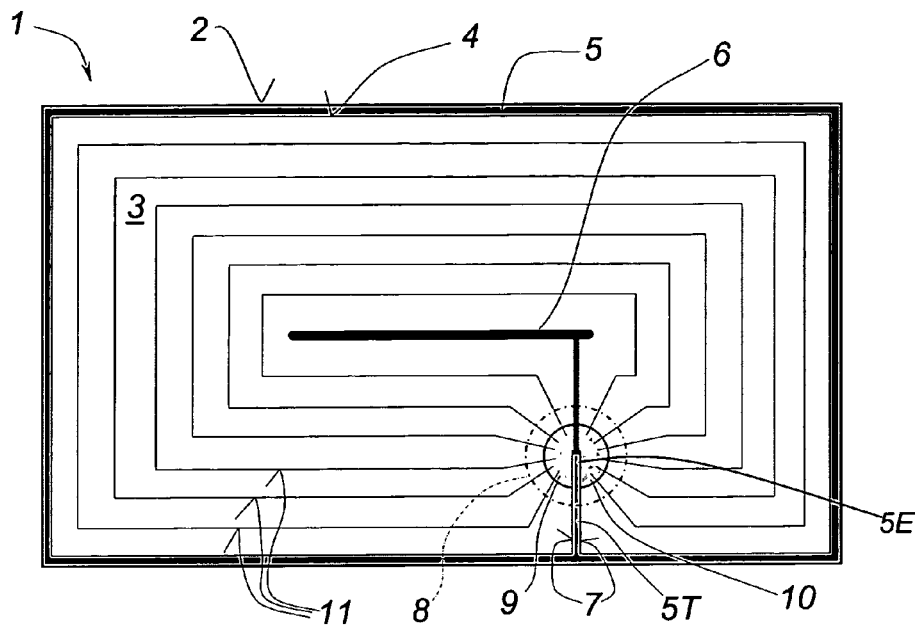
Fig. 1
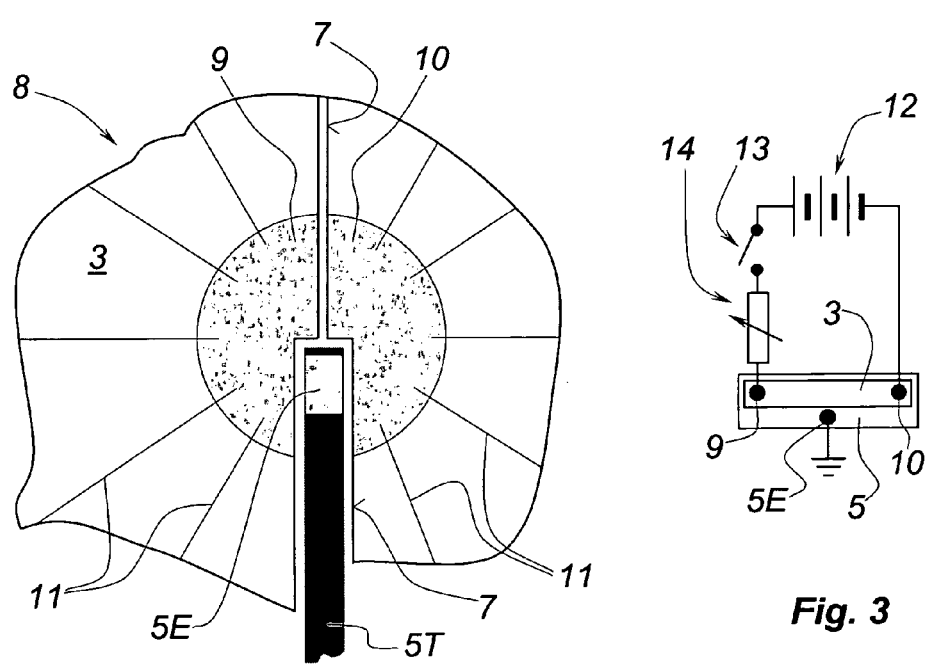
Fig. 2
Fig. 3

LAYERED HEATING PLATE ELEMENT

The invention relates to a plate element with layer heating having the features of the preamble of claim 1.

It is known in general that electrically conductive thin multilayer systems can be used as resistance heating members by applying an electrical voltage to them. There are many applications of this technique both in the automobile industry and in buildings.

It is often used to rid misting or ice from window panes or mirrors, so as to be able to easily see through the glass. However, such plate elements can also be installed on walls in or on buildings, instead of the usual heaters, or can be incorporated into them. For this purpose, they do not necessarily have to be produced in the form of windows, but may be in the form of mirrors, decorative surfaces, etc. Where appropriate, it is also possible to use such plate elements in general for the production of surface heat in technical equipment, for example in domestic electrical appliances, in which their small thickness and their smooth surfaces, which gather little dirt and are very easily cleaned, may offer great advantages.

In general, these multilayer systems deposited on flat substrates, for example glass panes, comprise at least one metal layer, for example made of silver, and (in transparent multilayer systems) dielectric layers on both faces of the silver layer, optionally also blocking layers made of very varied materials and sometimes also covering layers intended to increase the mechanical strength of the layered structure. In many cases, the infrared radiation reflection properties of these multilayer systems are used as thermal insulation.

The use of such layer heaters requires relatively high electrical voltages. In particular at the edge of the pane in question, which may be completely coated, it is necessary to provide reliable electrical isolation.

The original features are disclosed in document DE-A1-40 11 541 in the form of an electrically heated toughened alarm glass. By means of a separating line traced by a laser beam, a partial region of the electrically conductive coating for heating this glass is electrically isolated from the main surface region of the coating. The partial region is used as a sensor for detecting breakage of the toughened glass in question. This partial region may be mounted in a laminated pane or also in an insulating glazing unit. It is preferable to use a multilayer system that can withstand a high thermal load and that may already be deposited on its surface before the glass is toughened.

Original features are also disclosed in German patent application 10208552.8, which describes such a plate heating element to be used with a mains voltage. For isolating the external edge of the plate element, a partial surface is electrically isolated from the surface region of the coating, with heating power supply, by at least one peripheral cut line and is neutralized without any electrical connection.

Patent U.S. Pat. No. 3,892,947 describes a plate element made of fragile material, provided with a coating for heating, in which a conducting ribbon intended for feeding in the current extends along practically the entire outer perimeter of the element. The objective to be achieved is thus to cut off the supply of current by a local interruption in said conducting ribbon in the event of the plate element breaking.

The object of the invention is to present a novel use of the separate partial surface of a plate element with layer heating of this type.

According to the invention, this problem is solved by the features of claim 1. The features of the dependent claims present advantageous embodiments of this subject matter.

By connecting the partial surface to a ground potential, even higher protection is achieved, by its simple electrical isolation from the actual heating field. This may prove to be beneficial in particular when the heating field is used with relatively high voltages (for example a standard national mains voltage of 110 or 230 V).

The partial surface and the heating coating may in principle be produced independently of each other and even made from different conductive materials. It would for example be possible to produce the heating coating in a known manner in the form of a transparent multilayer system and, in contrast, to produce the partial surface with a printed conductive ink (for example a screen printing paste with a high silver content), where the two must be carefully separated from one another by a high electrical/galvanic resistance. A conducting ribbon, of the type known from the aforementioned U.S. patent, could also be provided as a protective conductor near the edge, on or in the plate element, the coating then extending not right up to the region of the surface covered by the conducting ribbon or alternatively the partial surface, by being subsequently removed therefrom, or else an appropriate insulation being provided between the continuous coating and the conducting ribbon or alternatively the partial surface.

Preferably, the partial surface and the heating coating will however be produced in a uniform manner known per se and the partial surface will be subsequently separated by one or more separating lines. It goes without saying that the coated substrate is itself not conductive.

If at least two parallel separating lines are provided between the coating and the partial surface, it may be advantageous to divide the coated narrow strip remaining between them into several parts isolated from one another. Thus, current flow along this narrow strip is prevented. As isolation, it is again possible to use short transverse separating lines.

In all the cases, the partial surface is, according to the invention, electrically connected in a unipolar manner to a grounded protective conductor. Such protective conductors ("protective contacts") are the norm, these being known as third conductors in European domestic electrical systems.

Preferably, a grounded partial surface on each free edge of the plate element will be provided along the outer edge of the element. In the case of a freely mounted plate element, the partial surface will preferably extend around its outer perimeter.

According to one advantageous embodiment, an electrical connector will be provided for the partial surface in spatial proximity to the connectors for the heating coating. This allows a particularly simple construction of the set of external electrical contacts for the plate element.

Of course, it is possible to provide, in a manner known per se, several current paths on a plate element according to the invention, where appropriate to be connected independently of one another, in order to be able when necessary to connect or disconnect the heating power in stages.

The length and the width of the current path or current paths and the surface conductivity (in ohms per square) of the multilayer system used are parameters that determine the electrical power consumption and the heating power of the plate element. Depending on the available or predetermined service voltage, it is possible to adjust and render uniform various heating power levels within wide limits by the arrangement of the current paths. The maximum permissible temperature will also depend on the operating range of the finished plate element. For example, if any direct contact by the user is not possible or envisioned, the temperatures may be substantially above 50° C. However, adhesive layers possibly bonded to the coated pane, for example adhesive films for a laminated pane, should of course be prevented from being damaged by the temperatures reached in normal service.

Provision is made in a preferred embodiment of the plate element for the rigid pane provided with the coating to be laminated to the coated surface with another electrically non-conductive plate or in all cases one that is isolated from the coating. In the region of the electrical connectors, provision may be made in an advantageous improvement for there to be, in one of the rigid panes, a recess through which the necessary mains conductors may be led.

Such a plate element is advantageously used in glazing for windows, or in mirrors, or in heaters, or else in domestic electrical appliances requiring surface heat to be produced.

Other details and advantages of the subject matter of the invention will become apparent from the drawings of illustrative examples and from their detailed description that follows.

In these drawings, which are schematic representations not drawn to scale:

FIG. 1 shows a view of a plate element with a heating coating and divided by separating lines;

FIG. 2 is an enlarged view of the connection region of the plate element as shown in FIG. 1; and FIG. 3 shows a simple example of an electrical circuit for the plate element.

In FIG. 1, a plate element 1 comprises a toughened pane 2, one main face of which—in this case the upper face—is covered with a complete electrically conductive coating 3. The coating 3 may be visually transparent, but this does not necessarily have to be so. Preferably, it is composed of a multilayer system having a high thermal resistance, with at least one metal layer, which is deposited before the pane 2 is toughened.

Traced peripherally in the coating 3 along the edge of the pane 2 is at least one fine separating line 4 a short distance—1 to 2 cm—from this edge. It is also possible to provide several parallel separating lines 4 a short distance apart. A peripheral outer edge strip 5 thus formed, here shaded light gray, is electrically isolated from the larger remainder of the coated surface. It forms an edge isolation for the plate element 1, which firstly ensures electrical isolation to the outside and secondly prevents corrosion of the coating possibly appearing at the outer edge and propagating into the surface. Provided in the middle of said surface is also a field 6 in the form of a ribbon, electrically isolated by separating lines.

However, this field does not necessarily have to be absolutely at the center of the coated surface, but it may be placed elsewhere than the center in relation with an appropriate arrangement of the active conductive tracks of the coating 3. Nor does it have to be in the form of a ribbon or be straight, rather it could also have any surface shape or even be angled or curved.

The separating lines mentioned up until now and hereafter form, in the coating, high-electrical-resistance interruptions through which no current can flow. The outer edge strip 5 is therefore completely isolated electrically from the coating.

A branch 5T of the coated edge strip 5 extends at one point over a certain distance into the surface of the coating 3. It is isolated from the coating 3 by two other parallel separating lines 7. Said branch terminates in a connection region 8 (indicated by a dot-dash circle) which is surrounded by the coating 3. The separating lines 7 extend separately or are joined together into one, where appropriate broad, line beyond the connection region 8 up to a separate field 6. A neutral layer region possibly enclosed between the two separating lines 7 may if required be divided into parts electrically isolated from one another.

It is not absolutely necessary to lead in the branch 5T as a straight line and at a right angle to the edge of the plate. It would also be possible, instead of the strip shown here, to provide a larger surface, for example a triangle, the base of which lies on the edge of the plate and the apex of which lies in the connection region.

Electrodes 9 and 10 are provided in the connection region 8 on either side of the separating lines 7 and of the branch 5T, each of these electrodes 9 and 10 being electrically/galvanically connected to the coating 3. The electrodes must each be connected to a pole of an electrical voltage (not shown in detail). An appropriate connection device is described in the prior patent application 10241728.8, to which reference will be made here.

As may be more clearly seen in FIG. 2, another electrode 5E is provided on the branch 5T. This other electrode is used to connect the branch 5T and the entire edge strip to a protective conductor. The connector needed for this purpose is also located in the connection region 8 and may be housed without any difficulty in the abovementioned connection device by means of slight modifications.

FIG. 3 shows an example of a symbolic circuit element of a plate element according to the invention. The electrodes 5E, 9 and 10 are indicated as connection points. The electrode 5E connected to the edge strip 5 is connected to the ground potential. The two electrodes 9 and 10 connected to the coating 3—shown as a resistance heating element—are connected to a suitable voltage supply 12. To complete the circuit, the figure shows a switch 13, for connecting or alternatively disconnecting the heating current, and a regulating member 14 for regulating the heating power.

Preferably, the electrodes are manufactured in a manner known per se with an ink that is a good electrical conductor, is resistant to heat and printable by screen printing. Preferably, this screen-printing ink or paste has a very high silver content. The electrodes 9, 10 and 5E are preferably printed before the pane 2 is toughened and are baked during the heating needed for the thermal toughening operation. If a plastic substrate is used for the plate element, baking is of course not possible, or only moderately.

In this case, it does not matter whether the electrodes 5E, 9, 10 are applied to the already deposited coating 3 or whether the coating 3 is deposited only after the electrodes have been formed, for example printed, on the pane.

To determine a defined path for the heating current through the surface of the coating 3, said path is in total divided, in a manner known per se, by a number of other separating lines 11 into a series of parallel current paths that extend between the two electrodes 9 and 10 and are also electrically connected in parallel.

In an actual heating plate element, other measures will be taken to make the heating power of these tracks uniform. These measures do not, however, form part of the subject matter of the present invention; on the contrary, reference may be made for this purpose to the prior patent application 10259110.5, which describes possible measures.

Plate elements of the type illustrated in FIGS. 1 and 2 are suitable, for example, for mounting in insulating glazing units, in which the corresponding spacing frame must be simply bonded to the edge strip 5. The grounding of this edge strip, described here, furthermore ensures that a spacing frame used, which may be made of metal, is reliably grounded.

Likewise, such plate elements may be hung directly in front of a wall or may be incorporated into the latter, without these elements being provided beforehand with a rear covering, provided that it is guaranteed in another way that the electrical service voltage entails no risk for the users. Finally, they may be incorporated without any problem in laminated panes in which it is necessary to place the active heating coated face on the inside of the composite and to use an adhesive layer appropriate to the surface temperatures.

The external connectors for the plate element may be brought out of such a composite or out of such an insulating glazing unit in principle via one of the end faces, for example in the form of printed conducting tracks or of connectors via flat strips. However, if the connection region is located in the surface of the plate element, it is also possible to provide, in one of the rigid panes joined together, a recess intended for the passage of the external connectors. In the case of an insulating glazing element, it is then also necessary to ensure that the intermediate space of the glazing unit is sealed in the region of this recess, for example by means of an annular spacing frame known per se.

The electrodes themselves are opaque (as a result of their high content of conductive materials, such as silver, and their substantially greater thickness compared with the coating itself) and they may, however, be visible from the uncoated side of the pane 2. They are therefore masked from view; but they may also form, for example, decorative elements—unlike the simple semicircular shape shown in the drawings—in order to form a flat logo of the company or manufacturer. Furthermore, it is also possible to obtain certain color effects, by coloring the conductive screen-printing paste preferably used to manufacture the electrodes.

The invention claimed is:

1. A plate element comprising:
   at least one rigid pane;
   an electrically conductive coating carried by the at least one rigid pane;
   connectors for connecting the electrically conductive coating to a source of electrical voltage to provide heating of the at least one rigid pane;
   an electrically conductive partial surface carried by the at least one rigid pane and electrically isolated from the coating; and
   with at least one electrical connector connected to the partial surface for connecting the partial surface to a ground potential.
2. The plate element as claimed in claim 1, wherein the partial surface deposited on the rigid pane with the coating is isolated from the coating by at least one non-conductive separating line.
3. The plate element as claimed in claim 2, wherein at least two mutually parallel non-conductive separating lines are provided and the partial surface is enclosed between the separating lines and divided into parts that are electrically isolated from one another.
4. The plate element as claimed in claim 1, wherein the partial surface is produced separately from the coating, is made of another material, and is deposited on the surface of the pane.
5. The plate element as claimed in claim 1, wherein the partial surface lies on an outer edge of the pane and extends in a form of a frame around the heating surface.
6. The plate element as claimed in claim 1, wherein the heating coating is regulated as regards operation with national mains voltage and the partial surface is provided for connection to a grounded protective conductor for protection from the mains voltage.
7. The plate element as claimed in claim 1, wherein the coating is formed by a layered system having a high thermal resistance, deposited on its surface before the pane is toughened.
8. The plate element as claimed in claim 1, wherein the connectors for connecting the electrically conductive coating to a source of electrical heating voltage, and the connector connected to the partial surface are grouped together locally in a connection region.
9. The plate element as claimed in claim 1, wherein at least one flat electrode is associated with each connector for electrically contacting the partial surface and the coating.
10. The plate element as claimed in claim 9, wherein the at least one flat electrode is produced, before or after the coating has been deposited, by applying an electrically conductive screen-printing paste.
11. The plate element as claimed in claim 1, wherein another plate is laminated to the coated surface of the rigid pane.
12. The plate element as claimed in claim 1, wherein a spacing frame for an insulating glazing unit is bonded to an edge region of the coated surface of the pane, via which another rigid pane is firmly joined to the pane bearing the coating.
13. The plate element as claimed in claim 11, wherein at least one recess is provided in one of the rigid plates joined to each other, to introduce external electrical connectors for the plate element.
14. The plate element as claimed in claim 13, wherein the recess is provided in a spatial arrangement with a connection region.
15. The plate element as claimed in claim 14, wherein at least the connection region is concealed from view by a mask.
16. The plate element as claimed in claim 9, wherein the at least one flat electrode forms a visible decorative element.
17. The plate element as claimed in claim 1, used in glazing for windows, or in mirrors, or in domestic electrical appliances requiring production of surface heat.

* * * * *